June 26, 1923.
E. STAUDER
BAND SAW MACHINE
Filed April 25, 1921
1,459,933
4 Sheets-Sheet 1
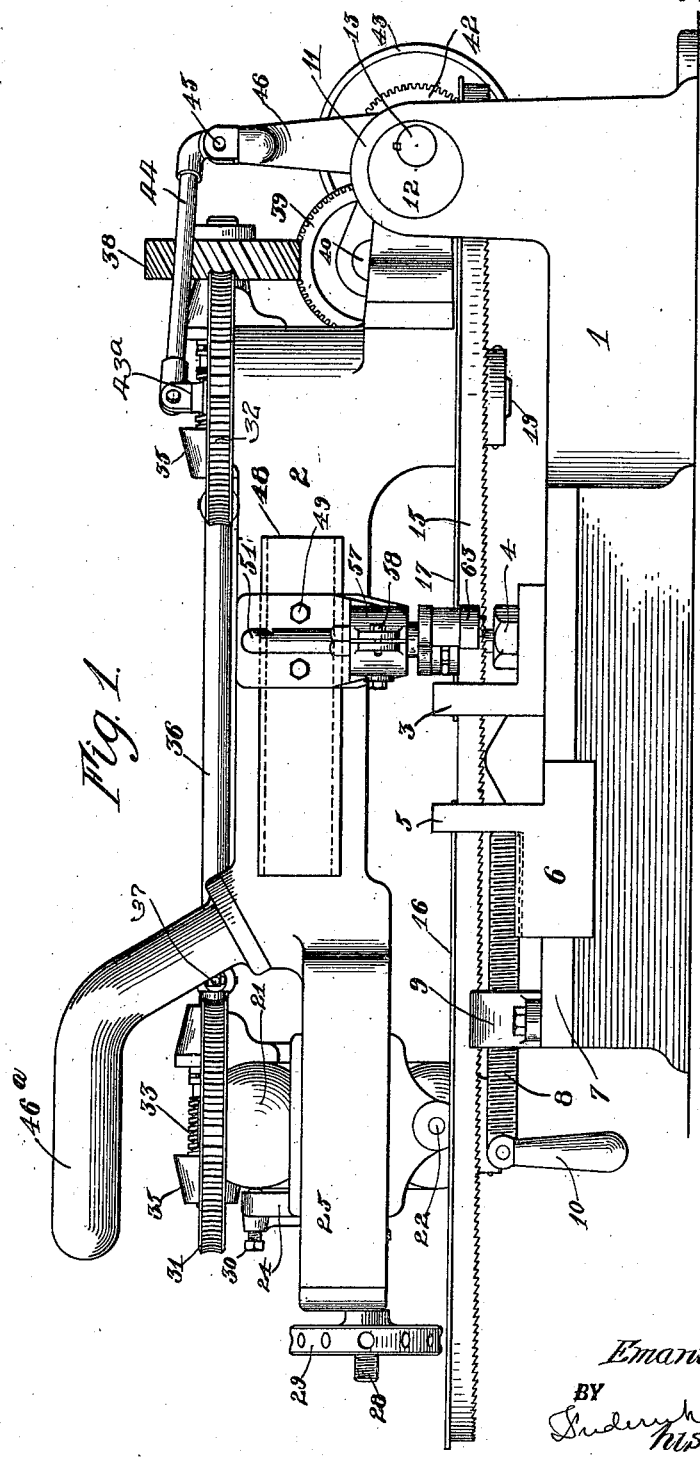
INVENTOR.
Emanuel Stauder
BY
HIS. ATTORNEY.

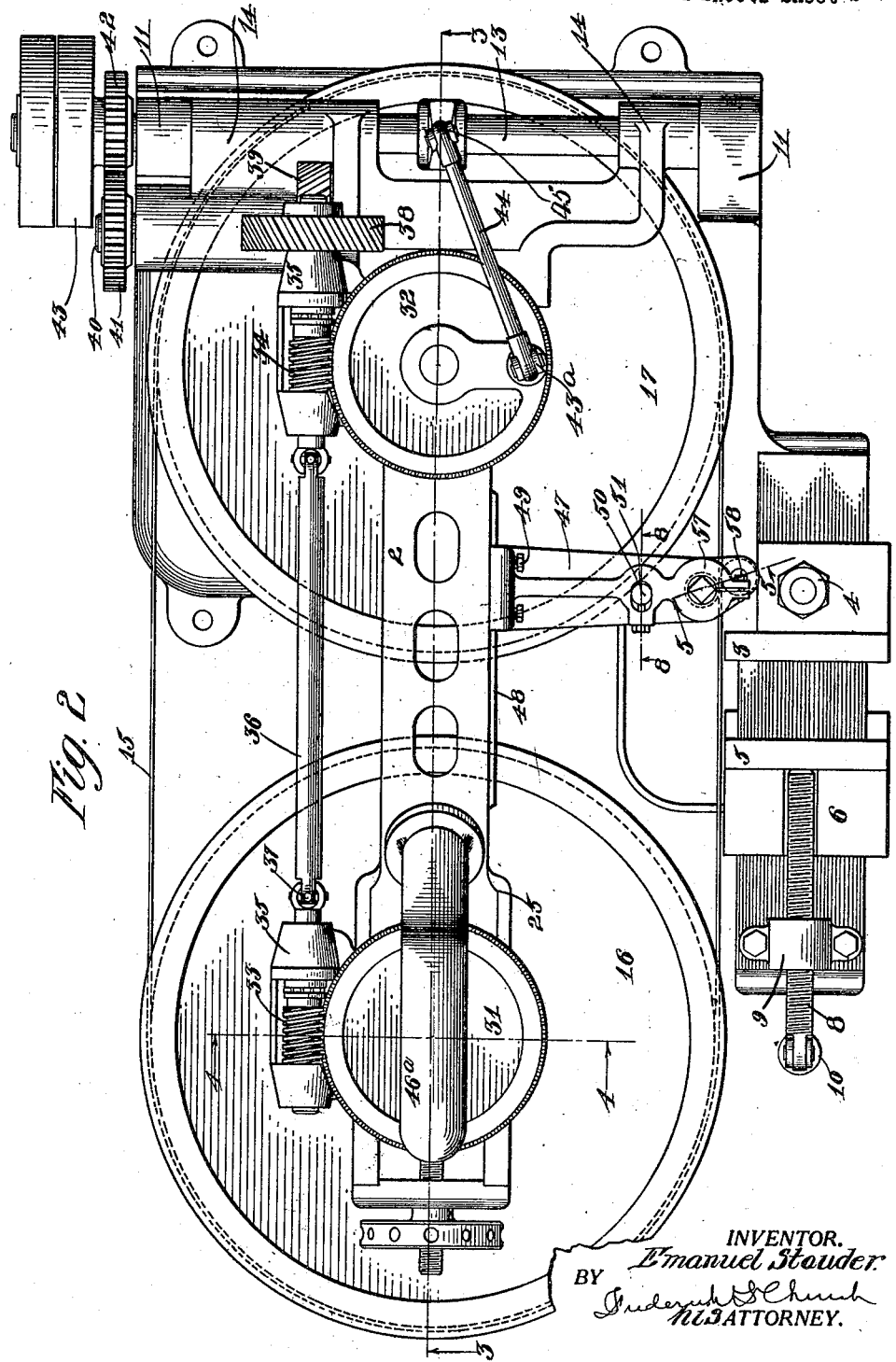

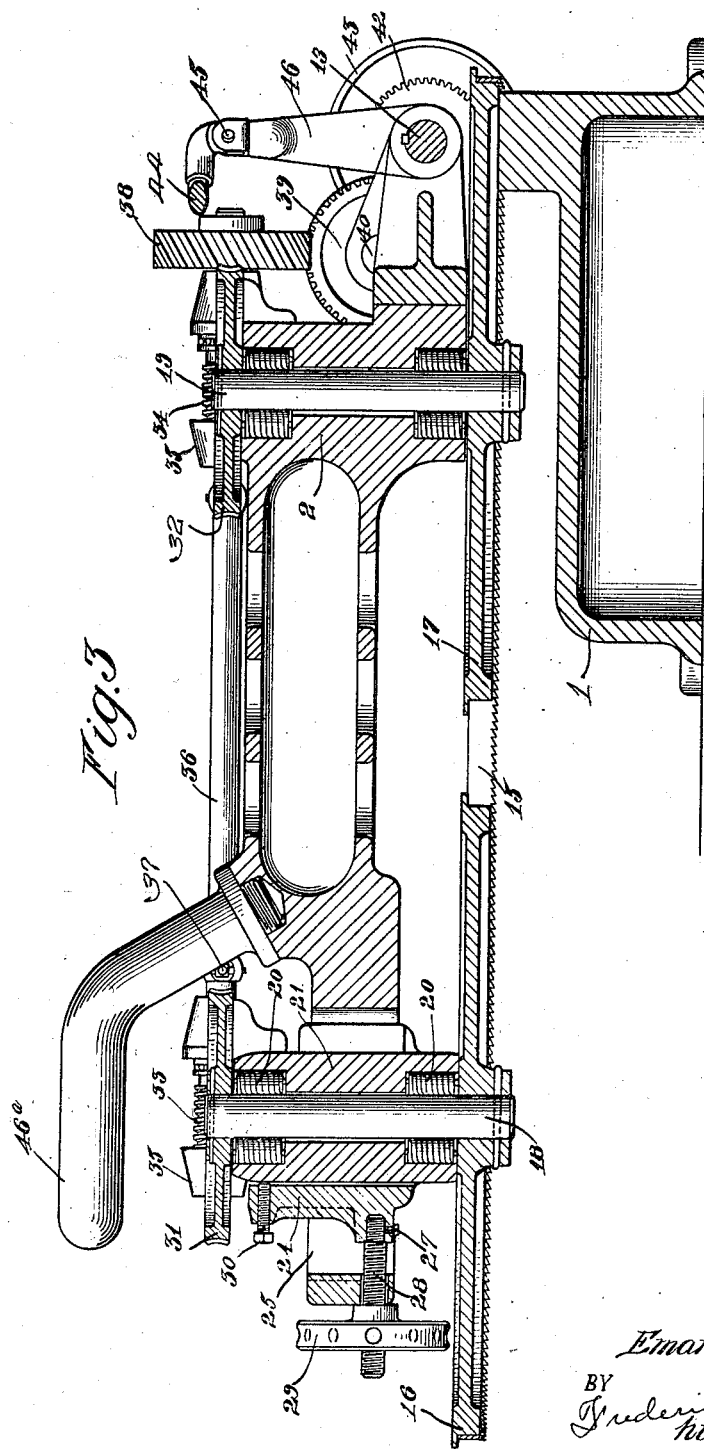

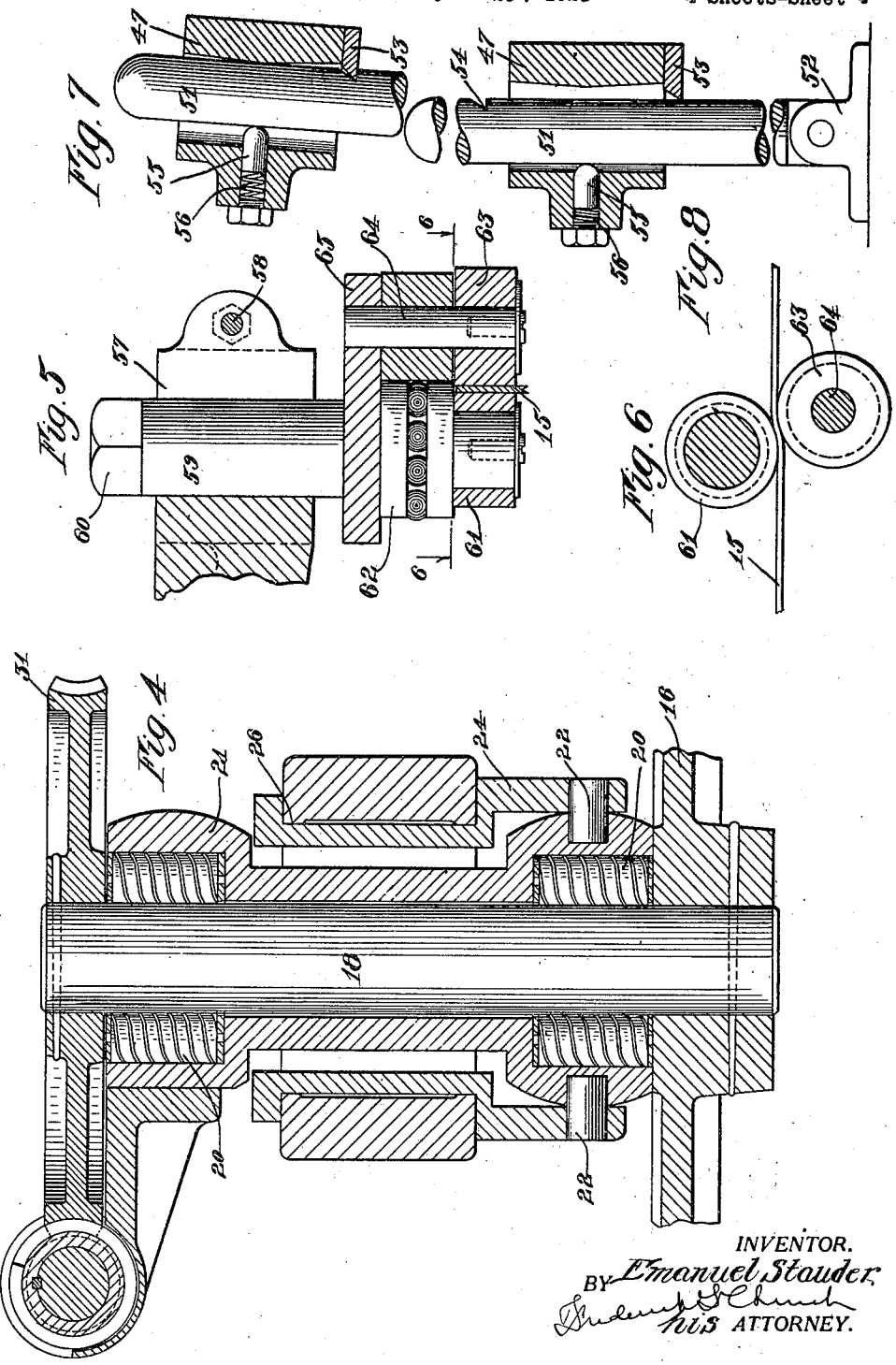

Patented June 26, 1923.

1,459,933

UNITED STATES PATENT OFFICE.

EMANUEL STAUDER, OF ROCHESTER, NEW YORK, ASSIGNOR TO HUTHER BROS. SAW MANUFACTURING COMPANY, OF ROCHESTER, NEW YORK, A CORPORATION OF NEW YORK.

BAND-SAW MACHINE.

Application filed April 25, 1921. Serial No. 464,158.

*To all whom it may concern:*

Be it known that I, EMANUEL STAUDER, of Rochester, in the county of Monroe and State of New York, have invented certain new and useful Improvements in Band-Saw Machines; and I do hereby declare the following to be a full, clear, and exact description of the same, reference being had to the accompanying drawings, forming a part of this specification, and to the reference numerals marked thereon.

The present invention relates to sawing machines and, more particularly, to metal cutting band saw machines, and it has for its object to provide a strong, efficient and compact machine of this nature that will be convenient to operate and adjust, and will comprise improved means for regulating and guiding the movement of the saw blade. The improvements are additionally directed toward providing a machine of strong and uniform driving power, and one in which the saw teeth will ride in cutting engagement with the work in such manner that the teeth will clear themselves and each successively will be assured a cutting contact. To these and other ends the invention consists in certain improvements and combinations of parts, all as will be hereinafter more fully described, the novel features being pointed out in the claims at the end of the specification.

In the drawings:

Figure 1 is a side elevation of a band saw machine constructed in accordance with and illustrating one embodiment of my invention.

Figure 2 is a top plan view thereof.

Figure 3 is a vertical longitudinal central section on the line 3—3 of Figure 2.

Figure 4 is an enlarged section partly broken away through the driving gear of one of the saw pulleys on the line 4—4 of Figure 2.

Figure 5 is an enlarged detail section on the line 5—5 of Figure 2.

Figure 6 is a section on the line 6—6 of Figure 5.

Figure 7 is an enlarged detail sectional view through the supporting leg of the saw frame with the leg in operative position, and Figure 8 is a similar view with the leg in inoperative position on the line 8—8 of Figure 2.

Similar reference numerals throughout the several views indicate the same parts.

To first give a general idea of the main characteristics of my machine, I provide a fixed frame carrying a work holder and a movable frame carrying the band saw running on two driving pulleys both of which are directly driven. The movable frame has an oscillating or rocking motion which is imparted to it continuously by a driving element mounted on the fixed frame but also communicating motion to the band saw pulleys of the movable frame. In this way, the movable frame being partially supported also by the work piece through the medium of the saw, the contact of the saw teeth with the work piece is ever changing and simulates the swinging motion that a carpenter combines with reciprocatory motion in using a hand saw and which is so effective, the saw teeth being more readily clear and one tooth being prevented from sliding along without effect upon the surface cut by a predecessor.

Referring more particularly to the drawings, 1 indicates the fixed frame or bed of the machine and 2 the movable frame. The former is fitted with a vice or work holder that may be of the usual or preferred construction, but which in the present instance comprises a fixed jaw 3 bolted to the bed at 4, and a movable jaw 5 having a carriage 6 traveling on a guide 7 toward and from the fixed jaw under the influence of a screw 8. The screw passes through a fixed nut block 9 and terminates in a pivoted handle 10. At the rear end of the fixed frame are provided two bearing support extensions 11 in which turn journals 12 fixed to and supporting a transverse shaft 13 which is eccentrically connected to the journal but does not turn therein, the shaft having a limited revolving motion instead of a rotary motion. The movable frame 2 is, however, mounted to turn or rock on the shaft 13 being provided with bearing extensions or yokes 14 for this purpose.

The band saw 15 runs upon two horizontal pulley wheels 16 and 17, carried at the lower end of two parallel vertical shafts 18 and 19 mounted in roller bearings 20 in the frame 2. The outer or forward shaft 18 is directly mounted in a bearing element 21 (Figures 3 and 4) having trunnions 22 at its lower end permitting the bearing element to rock in the plane common to the two shafts 18 and 19 on a carriage 24 in which the trunnions are journaled. All of these parts lie within a yoke shaped portion 25 of the frame 2 which is provided with guideways 26 on which the carriage 24 slides in a direction toward and from the other shaft 19 and to adjust the carriage in this way and tighten or loosen the band saw on the pulleys there is fixed to the carriage at 27 a screw 28 extending freely through the head of the yoke 25 and carrying a threaded wheel 29. Tightening this wheel against the yoke draws the carriage outwardly and stretches the saw.

I also preferably provide the carriage 24 with a set screw 30 that bears against the upper end of the bearing element 21 and by means of which the plane of the pulley wheel 16 may be shifted on the trunnions 22 in accordance with the plane of the pulley wheel 17 to cause the saw to track properly on the two wheels.

The upper end of each shaft 18 and 19 has secured thereto above the frame 2 a horizontally disposed worm gear 31 and 32. Co-operating with each such gear is a worm 33 and 34, such worms being suitably mounted in brackets 35 and being connected for joint movement by shaft 36. I prefer to join this shaft to the worm in each instance by means of a universal joint 37 which reduces the accuracy required in alining the various bearings and also permits of the above described adjustments of the shaft 18 carrying one of the band saw wheels. The worm 33 is thus driven from the worm 34 and both pulley wheels 16 and 17 are therefore positively driven which gives greater certainty and strength to the motion of the band saw itself.

The worm 34 has secured thereto a spiral gear 38 meshing with and driven by a similar gear 39 on a counter shaft 40 parallel to the shaft 13 but having bearings in the movable frame 2. At the opposite end of such countershaft is a gear 41 meshing with a gear 42 turning freely on the shaft 13. This gear 42 is fixed to or formed integrally with a driving pulley 43 and constitutes the main driving element of the machine. Inasmuch as the frame 2 rocks on the shaft 13 it will be noted that the gear 41, though bodily movable with the frame, has a revolving motion concentrically about the driving gear 42, and hence the movements of the frame 2 do not interfere with the proper meshing of these two gears at all times.

A continuous oscillating or rocking motion is imparted to the frame 2 from the main driving element while the latter is driving the band saw in the manner explained. This rocking motion is, roughly speaking, about the work piece in the holder 3—5 as a center due to a slight rising and falling of the rear end of the movable frame on the journal 12 to which it is eccentrically attached through the shaft 13. Such motion is brought about in this way: the worm gear 32 of the rear pulley wheel 17 carries a crank pin 43[a] to which one end of a pitman 44 is connected. The other end of the pitman is pivoted at 45 to a vertical arm 46 keyed to the shaft 13. As the worm 32 rotates the pitman rocks the shaft 13 to which the frame 2 is pivoted and as this shaft 13 is eccentric in its journal 12 it rises and falls within a limited arc, of course carrying the rear end of the frame with it. The band saw 15 is therefore constantly changing its direction of travel through the cut it is making, that is it is constantly taking a new angle with respect to the floor of the kerf so that one tooth does not follow another but has an opportunity to bite into the work at a new angle. As before stated this approximates or operates upon the same principle as the sweeping motion given to a hand saw that is effective in utilizing to the utmost the cutting engagement of each tooth.

The pressure of the saw on the work piece is maintained as usual through the weight of the frame 2 and when it is desired to displace this frame to remove the work piece or adjust the saw, or for other purposes, it is tilted upwardly by means of a handle 46[a] on the shaft 13 as a center. To maintain it temporarily in this raised position I provide a bracket 47 adjustably mounted on a guide 48 on the side of the frame 2 by means of set screws 49, the adjustment being longitudinally of the same (Figure 2). The bracket is provided with an opening 50 through which slidably extends a leg 51 having a pivoted foot 52 at its lower end that may rest upon the base 1. When the frame 2 is raised a detent 53 (Figure 7) on the under side of the bracket 47 locks into a notch 54 at an elevated point on the leg which latter is then ready to support the frame. Engagement with the detent is assured through the pressure on the opposite side of the leg 51 of a rounded pin 55 actuated by spring 56. To release the bracket from the leg the latter is simply thrust laterally to depress the pin.

There is also mounted on this bracket 47 an adjustable saw guide shown in detail in Figures 5 and 6. A split eye 57 at the outer end of the bracket having a clamping screw 58 provides a frictional clamp for a vertically movable and rotatable shank 59 having a squared upper end 60. The lower end of the shank carries a roller 61 below a thrust bearing 62 that tops the roller and overhangs its periphery. A companion roller 63 turns on an offset stud 64 carried by a lateral arm 65 on the shank 59. As the shank is rotated the roller 63 revolves about the roller 61 and both rollers are brought with greater or less pressure as desired against the intervening saw blade 15. This gives a firm lateral bearing for the saw at all times in the immediate vicinity of the work and prevents any deviation or chattering thereof beyond the freedom of movement desired by the operator. The upward thrust of the back of the saw is taken by the thrust bearing 62.

I claim as my invention:

1. In a band saw machine, the combination with a work holder, of a pair of pulley wheels, a band saw running on said wheels, a drive shaft and a driving connection between the latter and each of the wheels.

2. In a band saw machine, the combination with a work holder, of a frame, a pair of parallel shafts each having a pulley wheel thereon, a band saw running on said wheels, a worm gear on each shaft, a worm for driving each gear, a driving connection between the worms, a driving element and means for driving one of the worms from the latter.

3. In a band saw machine, the combination with a work holder and a frame, of means for oscillating one of said elements continuously relatively to the other, a band saw mounted on the frame, and means for driving the band saw.

4. In a band saw machine, the combination with a fixed frame and an oscillatory frame, of a work holder mounted on one frame and a band saw mounted on the other.

5. In a band saw machine, the combination with a fixed frame and an oscillatory frame, of a work holder mounted on the fixed frame, a band saw mounted on the oscillatory frame and a driving element on the fixed frame arranged to drive the band saw and to actuate the oscillatory frame.

6. In a band saw machine, the combination with a fixed frame having a work holder thereon and a driving element mounted on said frame, of a movable frame mounted to rock upon the axis of the driving element and driving connections from the latter adapted to drive the band saw and to rock the movable frame.

7. In a band saw machine, the combination with a fixed frame having a work holder thereon, of a rocking frame, a band saw mounted thereon, a rotary element on the rocking frame, driving means for the rotary element and band saw and a pitman eccentrically connected to the rotary element and to the fixed frame to continuously rock the rocking frame.

8. In a band saw machine, the combination with a fixed frame having a work holder thereon and a driving element mounted on said frame, of a movable frame mounted to rock upon the axis of the driving element, a band saw mounted on the movable frame, driving connections between the band saw and driving element embodying intermeshing gears on the latter and on the movable frame, respectively, and means for rocking the movable frame.

9. In a band saw machine, the combination with a fixed frame having a work holder thereon and a driving element mounted on said frame, of a movable frame mounted to rock upon the axis of the driving element, band saw pulley wheels on the movable frame, a band saw running on said pulleys, a rotary element arranged to turn with one of said pulleys, a pitman connected eccentrically to said rotary element and adapted to react against the fixed frame, means for driving the pulley wheels including a counter shaft mounted on the movable frame and intermeshing gears on the counter shaft and driving element respectively.

10. In a band saw machine, the combination with a fixed frame having a work holder thereon, of a rocking frame, band saw pulleys on said rocking frame, a band saw running on the pulleys, a worm gear for driving one of said pulleys and having a crank pin thereon, a pitman connected to the crank pin to react against the fixed frame and a driving element on the latter operatively connected to the worm gear.

11. In a band saw machine, the combination with a pair of pulley wheels and a band saw running thereon, of a work support and a saw guide adjacent thereto comprising a pair of members engaging upon opposite sides of the saw, one of said members being adapted to be swung bodily relatively to the other in an arc intersecting the plane of the saw.

12. In a band saw machine, the combination with a pair of pulley wheels and a band saw running thereon, of a work support and a saw guide adjacent thereto comprising a pair of rollers engaging upon opposite sides of the saw, one of said rollers being adapted to be adjustably swung about the other.

13. In a band saw machine, the combination with a fixed frame having a work holder thereon, of a shaft arranged to turn in said frame, an oscillatory frame arranged to turn on said shaft on a center different from its own turning center, a band saw carried by the oscillatory frame, and means for turning the shaft to rock the frame.

14. In a band saw machine, the combination with a fixed frame having a work holder thereon, of a shaft arranged to turn in said frame, an oscillatory frame arranged to turn on said shaft on a center different from its own turning center, a band saw carried by the oscillatory frame, driving mechanism for the band saw mounted on the oscillatory frame and means operated thereby to turn the shaft.

15. In a band saw machine, the combination with a fixed frame having a work holder thereon, of a shaft having an eccentric bearing in said frame, an oscillatory frame pivoted on said shaft, a band saw carried by the latter frame and means for rotating the shaft.

EMANUEL STAUDER.